(12) United States Patent
Lee et al.

(10) Patent No.: US 8,341,414 B2
(45) Date of Patent: Dec. 25, 2012

(54) LICENSE MANAGING METHOD AND DEVICE

(75) Inventors: Sang-Woo Lee, Daejeon (KR); Sin Hyo Kim, Daejeon (KR); Byung Ho Chung, Daejeon (KR); Hyunsook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 12/617,185

(22) Filed: Nov. 12, 2009

(65) Prior Publication Data

US 2011/0004765 A1 Jan. 6, 2011

(30) Foreign Application Priority Data

Jul. 6, 2009 (KR) .......................... 10-2009-0061336

(51) Int. Cl.
*H04L 9/32* (2006.01)

(52) U.S. Cl. ......... 713/176; 380/277; 711/117; 713/189

(58) Field of Classification Search .................. None
See application file for complete search history.

(56) References Cited

U.S. PATENT DOCUMENTS

| 7,269,743 | B2 * | 9/2007 | Yagawa ......................... 713/189 |
| 7,621,453 | B2 * | 11/2009 | Hepworth et al. ............. 235/454 |
| 2002/0178354 | A1 * | 11/2002 | Ogg et al. ..................... 713/155 |

FOREIGN PATENT DOCUMENTS

| KR | 10-2006-0068542 | 6/2006 |
| KR | 10-2008-0082875 | 9/2008 |
| WO | 2006/065012 | 6/2006 |

OTHER PUBLICATIONS

Sang-Woo Lee and Byung-Ho Chung, "Implementation of a SW-Based Secure Storage for License Protection", Internet and multimedia systems and application, Aug. 17, 2009.
Do-Won Nam, et al, "Design & Implementation of DRM Client for License-based Digital Content Distribution System", ETRI, vol. 1, No. 1, 2003, pp. 202-205.

* cited by examiner

*Primary Examiner* — Fikremariam A Yalew
(74) *Attorney, Agent, or Firm* — Staas & Halsey LLP

(57) ABSTRACT

A license managing device sets a security area for storing a license file, maintains the security area as an encoded file in an inactive state of the security area by encoding the security area, maintains the security area as a directory in an active state of the security area by decoding the security area, and encodes a license file by using a file encoding key according to the user's request and stores the same in a security area in an active state of the security area.

13 Claims, 6 Drawing Sheets

FIG.2
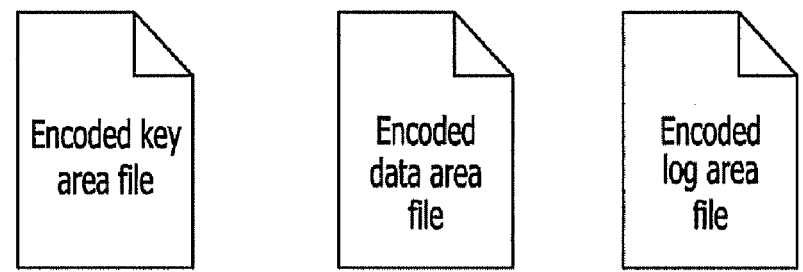
Security area inactive state
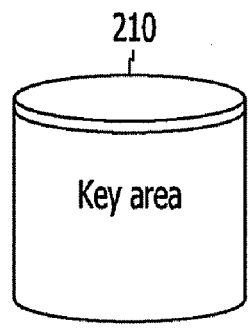
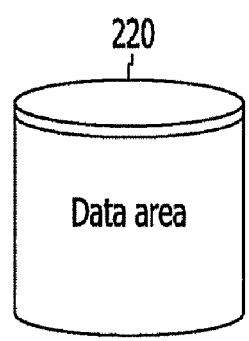
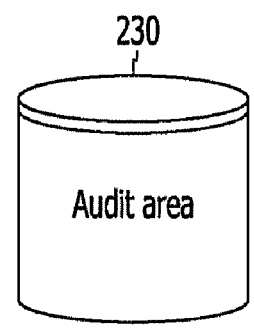
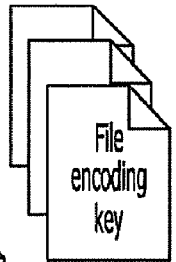
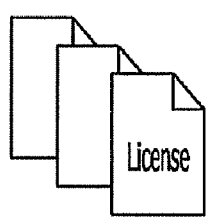
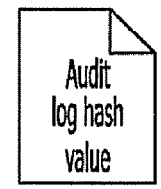
Security area active state

LICENSE MANAGING METHOD AND DEVICE

CROSS-REFERENCE TO RELATED APPLICATION

This application claims priority to and the benefit of Korean Patent Application No. 10-2009-0061336 filed in the Korean Intellectual Property Office on Jul. 6, 2009, the entire contents of which are incorporated herein by reference.

BACKGROUND OF THE INVENTION (a) Field of the Invention

The present invention relates to a license managing method and device.

(b) Description of the Related Art

Digital rights management (DRM) represents a skill for protecting the rights and advantages of contents providers, preventing illegal reproduction, and totally supporting contents generation, distribution, and management such as charging and paying usage fees.

A DRM system encodes contents and manages the key used for encoding the contents through a license so that the registered user may only decode the encoded contents and use the decoded contents. Therefore, it is required to store and manage the license in a secure manner.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a license managing method and device for securely storing and managing a license.

An exemplary embodiment of the present invention provides a license managing device including a virtual disk volume manager and an encoder. The virtual disk volume manager generates a virtual disk volume area by encoding a security area for storing a license file. In an active state, the encoder encodes the license file by using a file encoding key, stores it in the security area, and decodes the encoded license file by using the file encoding key according to the user's request to provide it to the user.

Another embodiment of the present invention provides a license managing method including: setting a security area for storing a license file; maintaining the security area as an encoded file with an encoded file in an inactive state of the security area by encoding the security area; maintaining the security area as a directory in an active state of the security area by decoding the security area; and encoding the license file by using a file encoding key according to the user's request and storing the same in the security area in the active state of the security area.

According to an embodiment of the present invention, a DRM terminal generates no additional cost since it can securely store the license without an additional hardwired device such as a USB device.

Further, the license can be managed securely by generating a security area for storing the license with a virtual disk volume area since a license file encoding key is not drained from the license if the DRM terminal is in danger of being hacked.

In addition, the license can be stored further securely by designating encoding and decoding or an expiration state for a master key for encoding the license file encoding key according to the life cycle of the master key, and forgery and falsification of the license in an active state of the security area can be prevented by monitoring illegal forgery and falsification in the security area.

BRIEF DESCRIPTION OF THE DRAWINGS

FIG. 2 shows an active state and an inactive state of a security area.

DETAILED DESCRIPTION OF THE EMBODIMENTS

Figure 1:
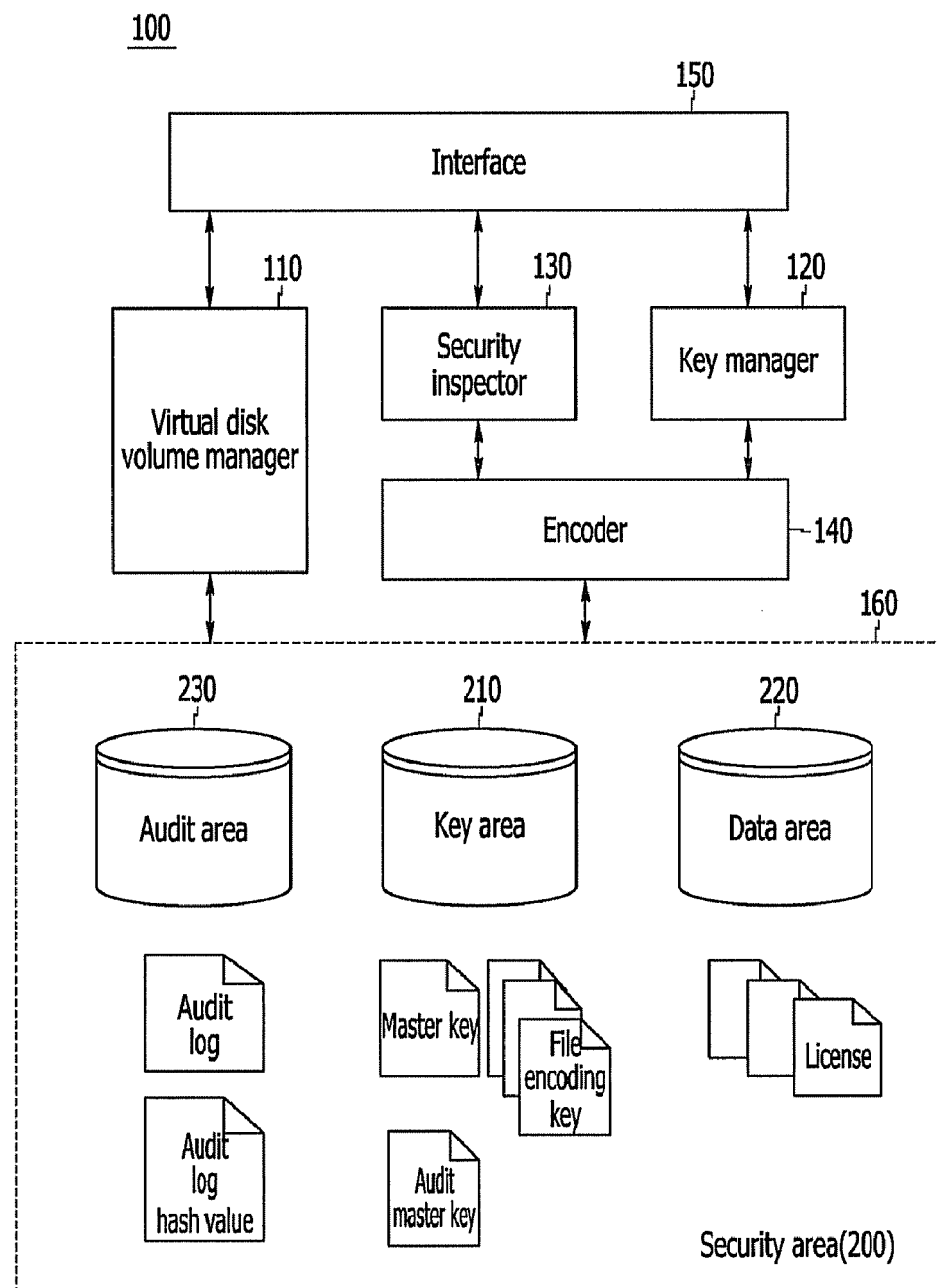
FIG. 1 shows a license managing device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising" will be understood to imply the inclusion of stated elements but not the exclusion of any other elements.

A license managing method and device according to an exemplary embodiment of the present invention will now be described with reference to accompanying drawings.

FIG. 1 shows a license managing device according to an exemplary embodiment of the present invention, and FIG. 2 shows an active state and an inactive state of a security area.

Referring to FIG. 1, the license managing device includes a virtual disk volume manager 110, a key manager 120, a security audit unit 130, an encoder 140, an interface 150, and a security storage unit 160.

The virtual disk volume manager 110 sets a security area 200 for storing a license file, and encodes the security area 200 by using a virtual disk volume encoding method to generate a virtual disk volume area. The virtual disk volume recognizes the USB memory area as a logical directory when a device such as a USB memory is mounted, and the logical directory disappears when the device is demounted.

That is, the virtual disk volume manager 110 maintains the security area with an encoded file in the inactive state of the security area 200, and reads the encoded license file from the security area 200 by encoding the security area 200 by using the virtual disk volume encoding method, and writes the same in the security area 200 in the active state of the security area 200 by decoding the same.

In this instance, the virtual disk volume encoding method can be expressed as in Table 1.

Table 1 shows steps of the virtual disk volume encoding method.

TABLE 1

| 1 | $T_1 = ENC(K_1, i)$ |
|---|---|
| 2 | $T_1 = T_1 \otimes \alpha^j$ |
| 3 | $T_2 = P \oplus T_1$ |
| 4 | $T_2 = ENC(K_2, T_2)$ |
| 5 | $C = T_1 \oplus T_2$ |

In Table 1, $K_1$ and $K_2$ are secret keys, P is a plain sentence, and according to the exemplary embodiment of the present invention, P represents a file for a key area 210, a data area 220, and an audit area 230 to be encoded in the security area 200. i represents a logical position of a space for storing a cryptogram, and j is a position for a data block to be processed in the entire data. Also, ENC indicates a symmetric key block encoding algorithm, and $\alpha$ is a primitive root of $GF(2^{128})$. $\otimes$ is a modular operation, and $\oplus$ is an exclusive OR operation. $T_1$ and $T_2$ are intermediate calculated values.

Referring to Table 1, the virtual disk volume encoding method encodes a logical position value of a space for storing the cryptogram C with a secret key $K_1$, performs a modular product operation on the encoded values $T_1$ and $\alpha^j$, performs an XOR operation on the modular operated value $T_1$ and the plain sentence, encodes the XOR-ed value $T_2$ with a secret key $K_2$, and performs an XOR operation on the encoded value $T_2$ and a modular product operated value $T_1$ to generate the cryptogram C.

That is, the virtual disk volume manager 110 encodes the files of the key area 210, the data area 220, and the audit area 230 by using the virtual disk volume encoding method, and as shown in FIG. 2, the key area 210, the data area 220, and the audit area 230 of the security area 200 are provided as encoded files in the inactive state of the security area 200. Also, since the files of the encoded key area 210, the data area 220, and the audit area 230 are decoded, the virtual disk volume manager 110 stores the files of the encoded key area 210, the data area 220, and the audit area 230 in the active state of the security area 200 into the corresponding directory, and mounts three encoded files on a specific directory by a user request. In this instance, the virtual disk volume manager 110 performs an authentication process using the user's password so that the encoded files may be mounted by the normal user.

Referring to FIG. 1, the key manager 120 manages a plurality of different file encoding keys, master keys, and audit master keys, and also manages the life cycle of the master key. The file encoding key is used to encode and decode the license file, the master key is used to encode and decode the license file encoding key, and the audit master key is used to generate a hash value of an audit log.

The security audit unit 130 performs a hash function operation by using the audit logs and the audit master keys of the security area 200 and the data area 220 of the key area 210 to generate a hash value for the audit log, and it monitors illegal access to the security area 200 and data forgery by using the hash value for the audit log. The audit log monitors illegal forgery and falsification on the security area 200.

The security audit unit 130 stores the audit logs on the key area 210 and the data area 220 of the security area 200 and the hash value for the audit logs in the audit area 230 of the security area 200. Also, the security audit unit 130 encodes the audit master key by using a key induced with a password, and stores the encoded audit master key in the key area 210 of the security area 200.

The encoder 140 uses a file encoding key to encode the license file and store it in the data area 220 of the security area 200, and decodes the license file encoded by the user's request and provides the same to the user. In this instance, the different license files are encoded and decoded using different file encoding keys. Also, the encoder 140 encodes the file encoding keys by using the master key, the master key is encoded by using the key induced from the password, and the encoded file encoding key and the master key are stored in the key area 210 of the security area 200.

The interface 150 functions as an interface between the virtual disk volume manager 110, the key manager 120, the security audit unit 130, and the encoder. 140, and the user.

The security storage unit 160 stores a license file, a file encoding key, a master key, and an audit master key. The security storage unit 160 is provided in the security area 200.

The security area 200 includes a key area 210, a data area 220, and an audit area 230. The key area 210 stores the file encoding key, the master key, and the audit master key, the data area 220 stores the license file, and the audit area 230 stores the audit logs for the key area 210 and the data area 220.

Figure 3:
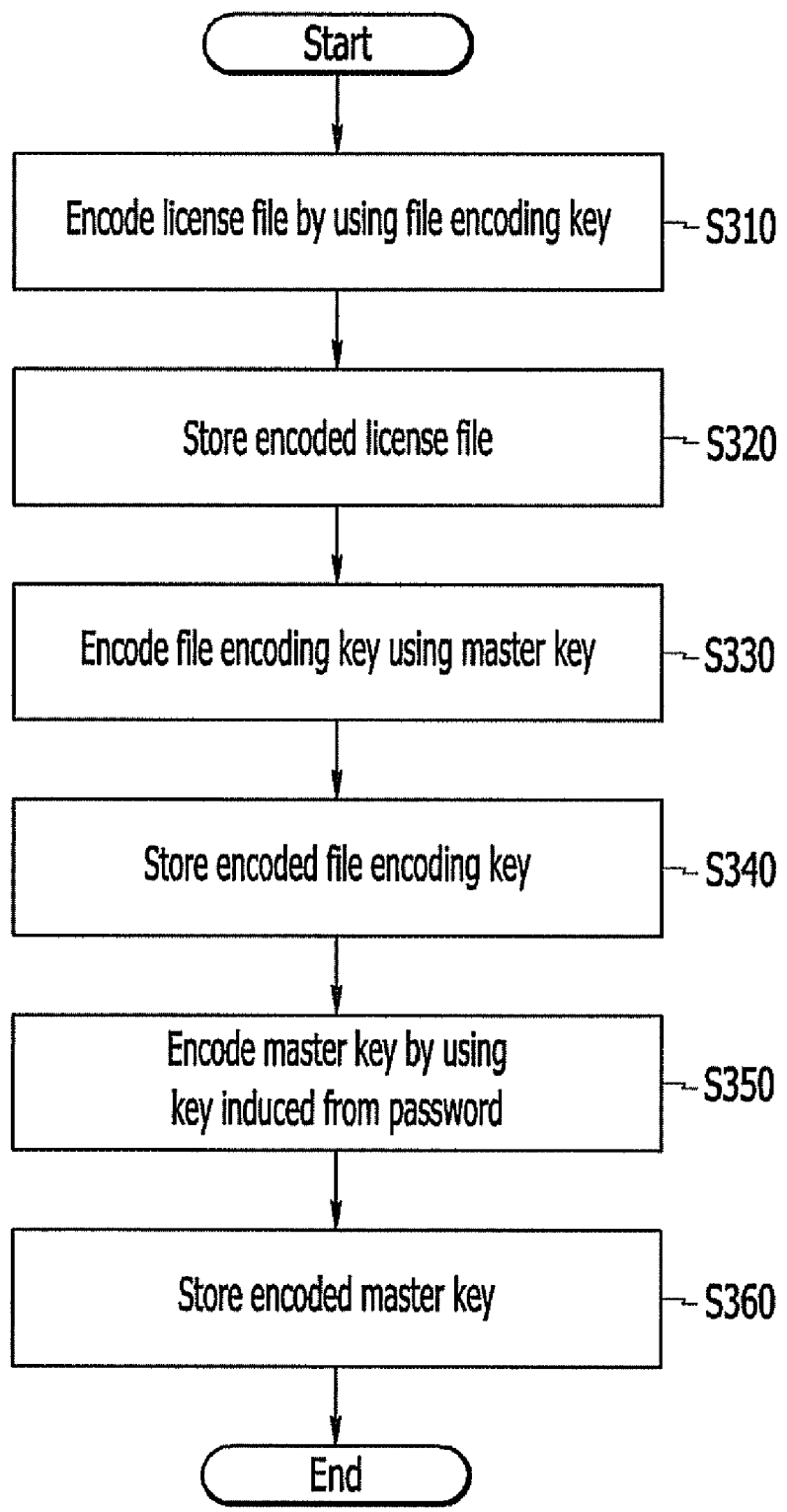
FIG. 3 shows a license file encoding method according to an exemplary embodiment of the present invention.

FIG. 3 shows a license file encoding method according to an exemplary embodiment of the present invention.

Referring to FIG. 3, the encoder 140 encodes the license file by using the file encoding key (S310), and stores the encoded license file in the data area 220 of the security area 200 (S320).

The encoder 140 encodes the file encoding key by using the master key (S330), and stores the encoded file encoding key in the key area 210 of the security area 200 (S340). Accordingly, the file encoding key is encoded and managed by using the master key, and encoding/decoding of the license file is controlled by the life cycle of the master key.

Further, the encoder 140 encodes the master key by using the key induced from the password (S350), and stores the encoded master key in the key area 210 of the security area 200 (S360).

Figure 4:
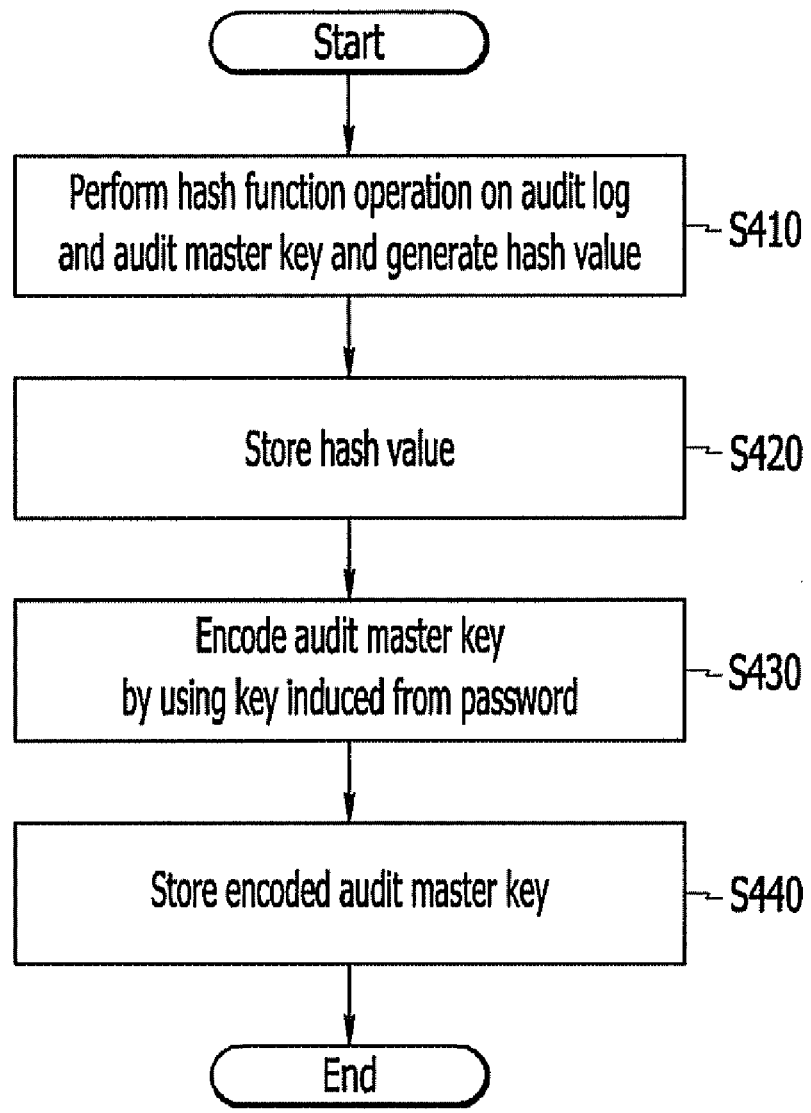
FIG. 4 shows a method for generating a hash value of an audit log according to an exemplary embodiment of the present invention.

FIG. 4 shows a method for generating a hash value of audit log according to an exemplary embodiment of the present invention.

Referring to FIG. 4, the security audit unit 130 performs a hash function operation by using the audit logs and the audit master keys of the key area 210 and the data area 220 of the security area 200 to generate a hash value of the audit log (S410), and stores it in the audit area 230 of the security area 200 (S420) to check integrity of the key area 210 and the data area 220 through the hash value of the audit log.

Also, the security audit unit 130 encodes the audit master key by using the key induced from the password (S430), and stores the encoded audit master key in the key area 210 of the security area 200 (S440).

Figure 5:
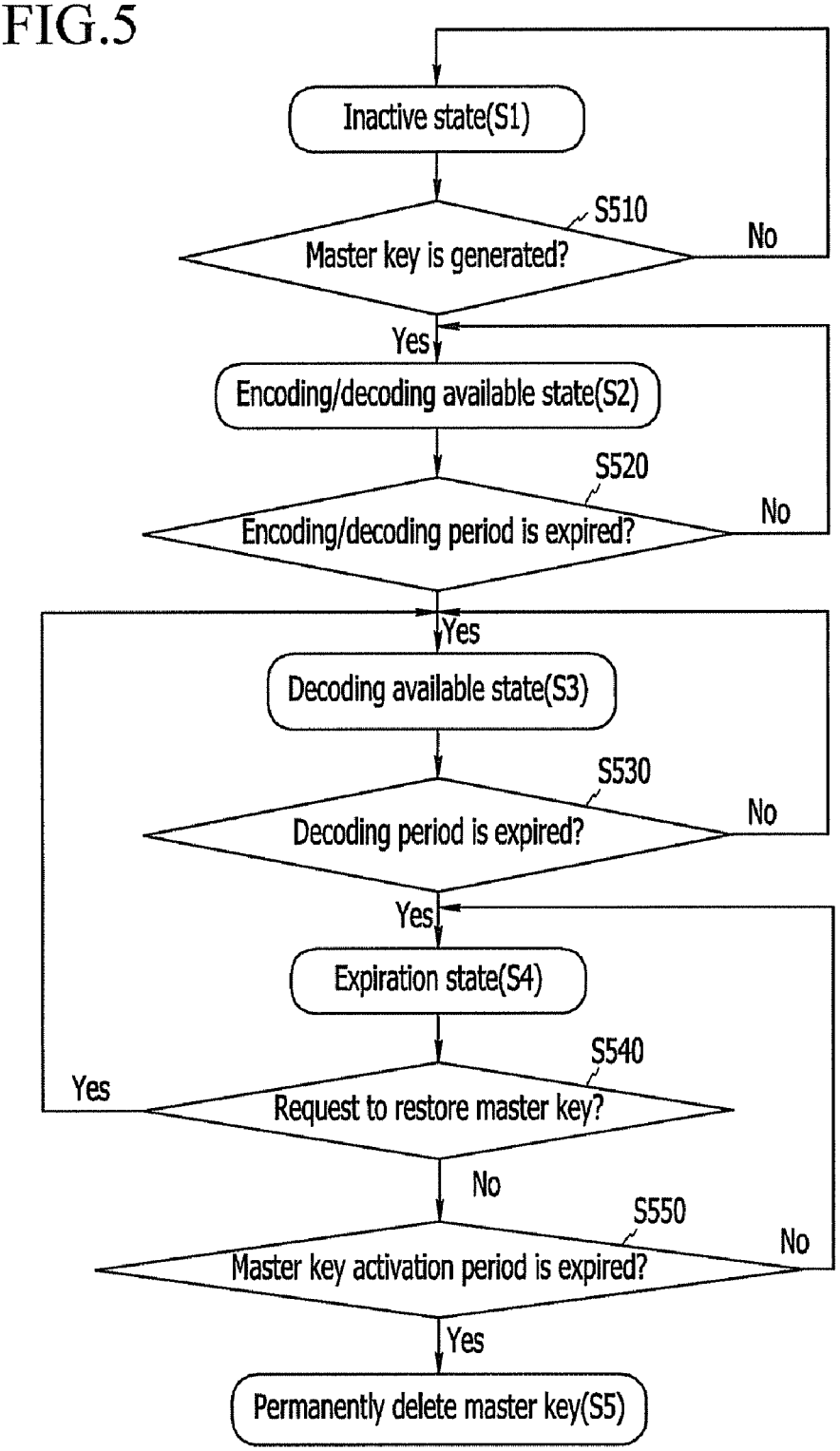
FIG. 5 shows a change of a life cycle of a master key according to an exemplary embodiment of the present invention.

FIG. 5 shows a change of a life cycle of a master key according to an exemplary embodiment of the present invention.

Referring to FIG. 5, the life cycle of the master key includes an inactive state S1, an encoding/decoding available state S2, a decoding available state S3, an expiration state S4, and a permanent deletion state S5.

When a master key is generated (S510) from the inactive state S1 in which the master key is not yet generated, the master key becomes the encoding/decoding available state S2 available for encoding and decoding the license file. In this instance, when the period of encoding/decoding the master key is expired (S520), it becomes the decoding available state S3 in which the license file cannot be encoded but can be decoded.

When the period of decoding the master key is expired S530, it becomes the expiration state S4 in which the license file cannot be encoded and decoded.

When the user requests to restore the master key (S540) in the master key's expiration state S4, the master key becomes the decoding available state S3, and when the user does not request to restore the master key and the master key's active period is expired S540 and S550, the master key becomes the permanent deletion state S5.

Since the key manager 120 manages the master key's life cycle, the license file can be stored in further secure manner. That is, when the master key's life cycle used for encoding is not managed and the encoding key is permanently valid, the key's security is not guaranteed because of the encoding algorithm and the characteristic of the encoding with the key of which the size is publicized. For example, when a long time is given, the encoding key can be drained by using a pre-search method. Therefore, when the master key's valid period is managed to be lesser than the prior art, the security of the encoding key can be increased by managing the master key's life cycle according to the exemplary embodiment of the present invention even if the encoding key is drained through the pre-search method.

Figure 6:
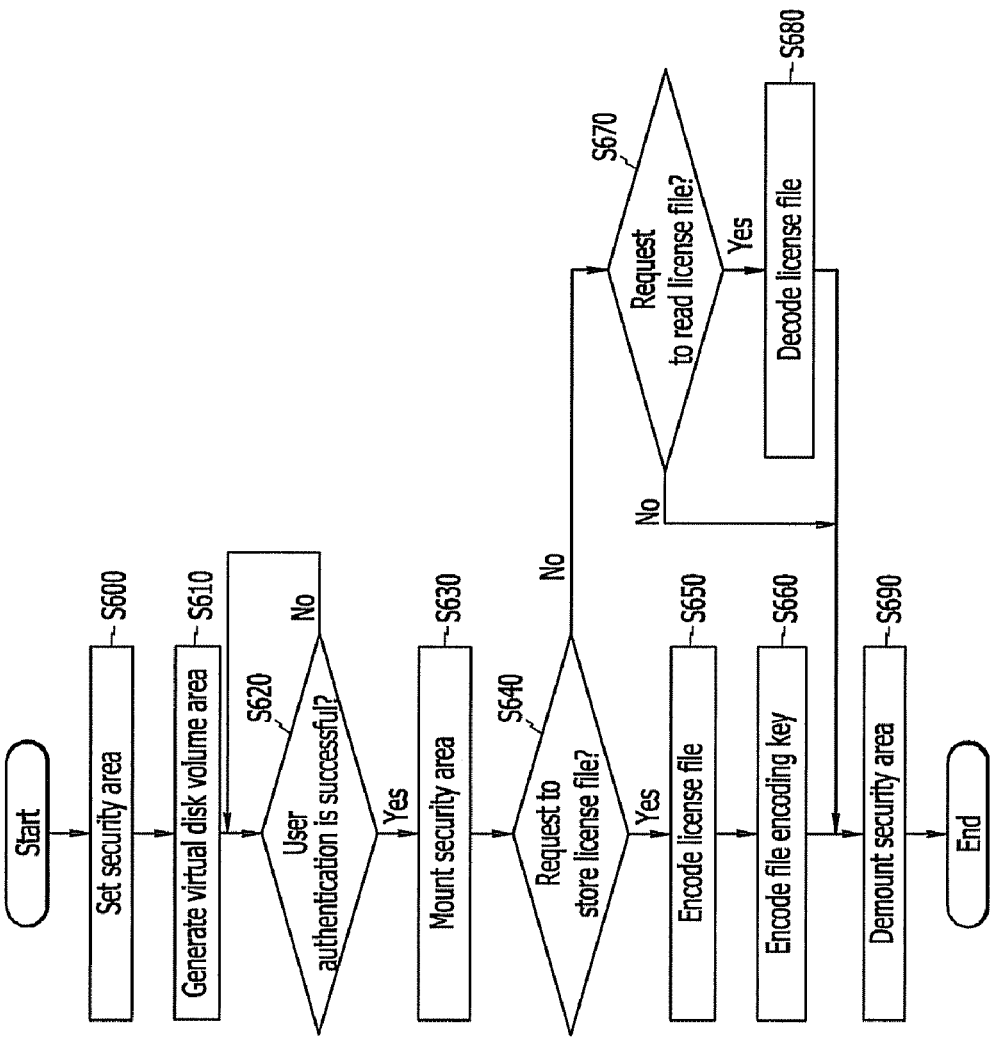
FIG. 6 shows a license managing method according to an exemplary embodiment of the present invention.

FIG. 6 shows a license managing method according to an exemplary embodiment of the present invention.

Referring to FIG. 6, the virtual disk volume manager 110 sets the security area 200 (S600), and encodes the security area 210 to generate it as the virtual disk volume area by using the virtual disk volume encoding method (S610).

Further, the virtual disk volume manager 110 authenticates the user by using the password of the user (S620). In this instance, when user authentication is successful, the security area 200 is mounted (S630).

The virtual disk volume manager 110 activates the security area 200 by decoding the security area 200 according to the user's request. When the security area 200 is activated as described, the license file can be read and stored.

That is, when storing the license file according to the user's request (S640), the encoder 140 encodes the license file in the data area 220 of the security area 200 by using the file encoding key (S650), encodes the file encoding key by using the master key, and encodes the master key and stores the same in the key area 210 of the security area 200 (S660).

Also, when reading the license file by the user S670, the virtual disk volume manager 110 reads the encoded license file from the data area 220 of the security area 200, decodes it, and provides it to the user (S680). In this instance, the life cycle of the master key is managed by the key manager 120, and hence, the license file is encoded and decoded.

Accordingly, the license file encoding and decoding operation is finished by the user' request, and the virtual disk volume manager 110 encodes the security area 200 to control the security area 200 to enter the inactive state and demount the security area 200 (S690).

The security audit unit 130 periodically or non-periodically performs a hash function operation by using the audit log and the audit master keys for the key area 210 and the data area 220 of the security area 200 to generate a hash value of the audit log, and checks integrity of the key area 210 and the data area 220 of the security area 200 through the hash value of the audit log.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A license managing device comprising:
a virtual disk volume manager for generating a virtual disk volume area by encoding a license file of a security area using a virtual disk encoding method for storing the license file, wherein; and
an encoder for, in an active state, encoding the license file by using a file encoding key, storing the encoded license file of the security area, and decoding the encoded license file by using the file encoding key according to the user's request to provide the decoded license file to the user,
wherein the encoder encodes the file encoding key by using a master key, encodes the master key by using a key that is induced from a password for user authentication, and stores the encoded master key in the security area, and
wherein the virtual disk volume manager authenticates the user when the security area is active.

2. The license managing device of claim 1, further including
a key manager for managing a life cycle of the master key, wherein
encoding and decoding of the license file are performed according to the life cycle of the master key.

3. The license managing device of claim 2, wherein
a state of the life cycle of the master key includes:
an inactive state before the master key is generated;
an encoding and decoding state in which the master key can be encoded and decoded;
a decoding available state in which an encoding and decoding period is expired and decoding is available;
an expiration state in which a decoding period is expired and the license file cannot be encoded and decoded; and
a permanent deletion state in which an active period of the generated master key is expired and the master key is permanently deleted.

4. The license managing device of claim 1, further including
a security audit unit for performing a hash function operation on an audit log and an audit master key for the security area to generate a hash value of the audit log, and monitoring illegal access to the security area and data forgery.

5. The license managing device of claim 4, wherein
the security audit unit encodes the audit master key by using a key that is induced from a password used for user authentication, and stores it in the security area.

6. The license managing device of claim 1 wherein
the security area includes:
a key storing area for storing at least the license file encoding key and the master key;
a data area for storing an encoded license file; and
an audit area for storing an audit log for the security area.

7. A license managing method comprising:
setting a security area for storing a license file;
maintaining the security area as an encoded file with an encoded file in an inactive state of the security area by encoding the license file of the security area;
maintaining the security area as a directory in an active state of the security area by decoding the license file of the security area; and
encoding the license file by using a file encoding key according to the user's request and storing the encoded license file in the security area in the active state of the security area,
wherein the encoding the file encoding key by using a master key, encoding the master key by using a key that is induced from a password for user authentication, and storing the encoded master key in the security area, and authenticating the user when the security area is active.

8. The license managing method of claim 7, further including
decoding the encoded license file according to the user's request by using the file encoding key, and providing the decoded license file to the user in the active state of the security area.

9. The license managing method of claim 8, wherein the storing includes
encoding the license file by using the file encoding key, and storing the encoded license file in the security area;
encoding the file encoding key by using the master key, and storing the encoded file encoding key in the security area; and
encoding the master key by using a key that is induced from a password used for user authentication, and storing the encoded master key in the security area.

10. The license managing method of claim 9, wherein the storing further includes
managing a state of a life cycle of the master key, and the license file is encoded and decoded according to a state of the life cycle of the master key.

11. The license managing method of claim 7, further including
monitoring illegal access to the security area and data forgery.

12. The license managing method of claim 11, wherein the monitoring includes
performing a hash function operation on an audit log and an audit master key for the security area to generate a hash value for the audit log; and
monitoring the security area with the hash value for the audit log.

13. The license managing method of claim 12, wherein the monitoring further includes
encoding by using a key that is induced from a password used for user authentication, and storing in the security area.

* * * * *